Figure 1:
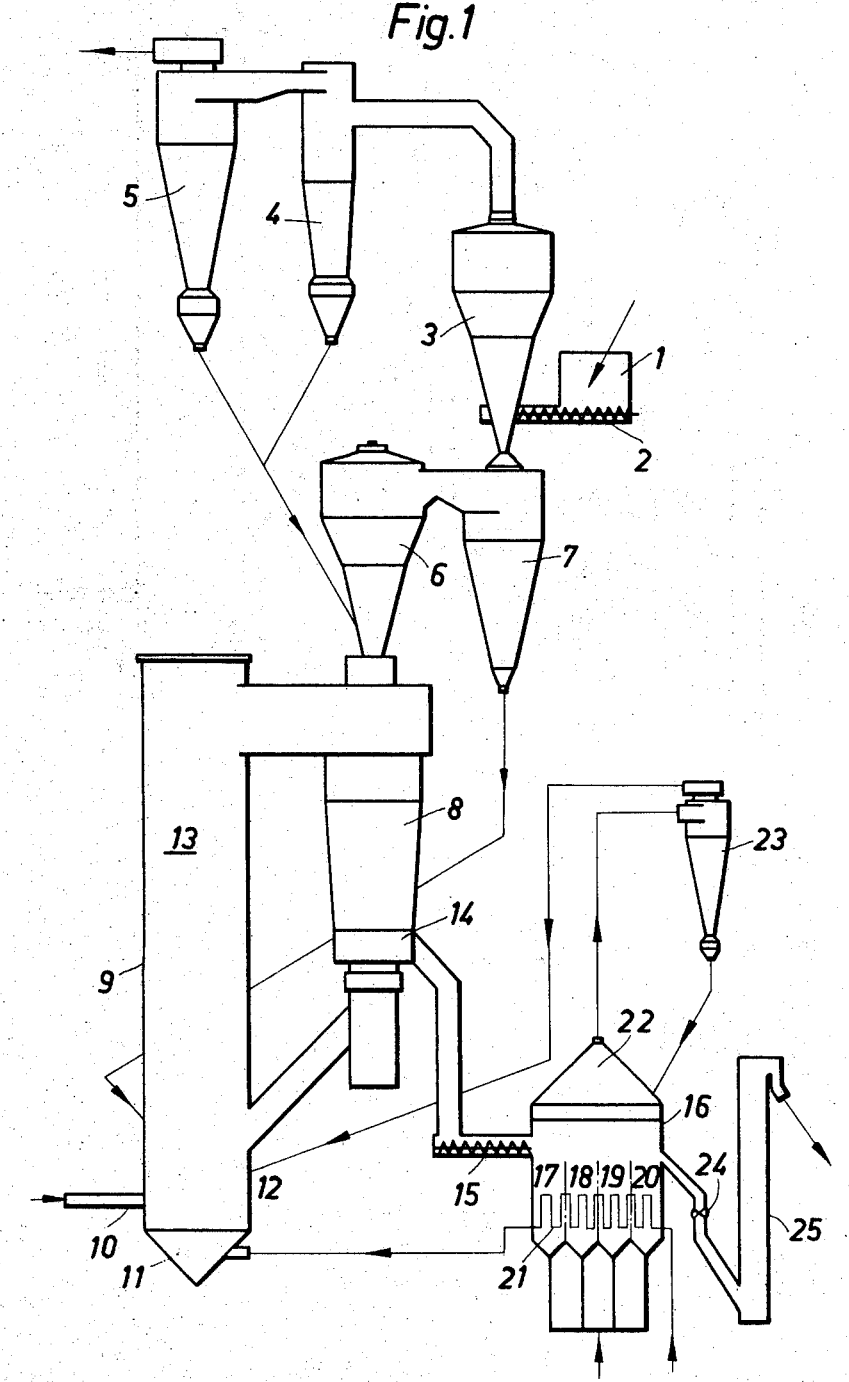

United States Patent

[11] 3,565,408

| [72] | Inventors | Lothar Reh<br>Bergen-Enkheim;<br>Karlheinz Rosenthal, Neu-Isenburg,<br>Germany |
|---|---|---|
| [21] | Appl. No. | 733,891 |
| [22] | Filed | June 3, 1968 |
| [45] | Patented | Feb. 23, 1971 |
| [73] | Assignee | Metallgesellschaft AG and Vereinigte<br>Aluminium-Werke AG |
| [32] | Priority | June 16, 1967 |
| [33] | | Germany |
| [31] | | M-74403 |

[54] PRODUCTION OF ALUMINA FROM ALUMINUM HYDROXIDE
5 Claims, 2 Drawing Figs.

[52] U.S. Cl. .................................................... 263/52, 23/141; 263/21
[51] Int. Cl. .................................................... F27b 15/00
[50] Field of Search........................................ 23/141, 143, 1 (F), 1 (F2), 262, 288.3 (S); 263/21 (A), 52

[56] References Cited
UNITED STATES PATENTS

| 2,833,622 | 5/1958 | Roberts et al............... | 23/142 |
| 2,919,905 | 1/1960 | Bayard ........................ | 23/288(.3S)X |
| 3,265,465 | 8/1966 | Turpin......................... | 23/142 |
| 3,336,109 | 8/1967 | DuBellay et al. ............ | 23/142 |

FOREIGN PATENTS

| 678,562 | 1/1964 | Canada ........................ | 23/142 |

Primary Examiner—John J. Camby
Attorney—Karl F. Ross

ABSTRACT: Aluminum hydroxide is first dehydrated in a suspension-type heat exchanger system by hot gas coming from a fluidized bed furnace with material recycling and then introduced into the fluidized bed. Hot alumina taken from the fluidized bed is used in a heat exchanger to preheat fresh air which is used as the fluidizing gas for the fluidized bed. Another portion of air is also heated in the heat exchanger and is introduced into the fluidized bed as secondary air.

3,565,408

SHEET 2 OF 2

Inventors
LOTHAR REH
KARLHEINZ ROSENTHAL

PRODUCTION OF ALUMINA FROM ALUMINUM HYDROXIDE

This invention relates to a process for producing anhydrous alumina from aluminum hydroxide in a fluidized bed.

It is known to dehydrate alumina in an orthodox fluidized bed. An orthodox fluidized bed is a dispersion in which a dense phase having a surface like that of a boiling liquid is separated by a sudden change in density from the gas or dust space over the fluidized-solids phase. In the dense fluidized phase, the solids are fluidized by the gas and occupy about 30—55 percent of the volume of the bed. As the particle size of the solids is never perfectly uniform in practice, individual particles, particularly the finer ones, will always be entrained by the gas so that the gas space over the surface of the fluidized bed is not entirely free from solids. The rate at which solids are entrained by the gas depends mainly on the particle-size distribution and on the specific gravity of the solids and on the velocity of the gas. In any case, however, the solids density is much lower over the fluidized bed than in said bed and is, in most cases, only a fraction of 1 percent of the volume which is occupied by the gas.

It is known to dehydrate and heat pulverulent substances in the form of a cloud of dust by a treatment with hot gases. Clouds of dust can be defined as dispersions which have no defined upper boundary layer and in which the gas flows at a much higher velocity than is permissible for maintaining a stationary fluidized bed. Solids are quickly entrained by the gas from the desired locale of the clouds of dust and carried out of the equipment and new solids must be continuously fed into the system to maintain the cloud of dust. The concentration of solids in the cloud of dust is much lower than in an orthodox fluidized bed but much higher than in the dust space of an orthodox fluidized bed. There is, in "cloud" systems, no sudden change in density between the dense phase and the dust space over said phase. However, the solids concentration in the cloud of dust continuously decreases in an upward direction. Average solids densities of about 10—100 kg./cu.m. are usual throughout the furnace. The solid density may locally increase to as much as 300 kg./cu.m.

According to another proposal for calcining fine grained aluminum hydroxide, a relatively low-temperature partly dewatered aluminum hydroxide is fed into the upper portion of a cloud of dust and is completely calcined at 1,100—1,300° C. A gas velocity of 1,500—3,000 standard cubic meters per square meter per hour and a correspondingly high solids concentration is used. The density of the suspension decreases upwardly and exceeds 30 kg./cu.m. on an average over the height of the reaction zone, and is 100—300 kg./cu.m. in the lower section of the reaction zone. The solids entrained by the gas are carried into a separator and are partly recirculated to the lower section of the cloud of dust.

In another known process for producing alpha-phase alumina in two stages by a continuous dehydration and subsequent crystallization, the dehydration is effected generally within less than a minute by a very rapid heat exchange between the aluminum hydroxide and the hot gases, and the dehydrated product is subsequently transformed into the alpha phase in that the product is left within the temperature range of 900—1,200° C., for about 10 to 120 minutes without additional heating or with the supply of only very little additional heat.

Another process for producing $Al_2O_3$ uses a fluidized bed. The solids are discharged together with the gases from the upper end of the shaft and are separated from the gas in a separator and partly recycled into the fluidized bed for supplying heat thereto. At least part of the heat is supplied by hot gases, which are introduced into the fluidized bed over the grate. In this process, the hot gases, which are at a temperature of at least 500° C., are introduced at the level of an enlarged portion of the shaft and at a velocity such that a highly expanding fluidized bed is formed which has no defined upper boundary. The recirculated solids are introduced at a point which is above the grate and below the hot gas inlet.

It is a common disadvantage of the aforesaid processes that heat is not utilized satisfactorily. The various proposals also involve other drawbacks.

The dehydration in an orthodox, dense fluidized bed involves the difficulty that the density of the material increases greatly in the high-temperature zone. This shrinkage may cause the fluidized bed to become immobile. Owing to the small particle size of the aluminum hydroxide processed therein, e.g., about 50 to 100 microns, the orthodox fluidized bed can only be maintained if the fluidizing gas flows at correspondingly low velocities. This results in a low throughput per unit of area of the fluidized-bed furnace. An arrangement of a plurality of orthodox fluidized beds one above another involves difficulties because the dust contained in the exhaust gases from the preceding stages in the direction of gas flow may clog the grates of the following stages in the gas-flow path, and because it is difficult to maintain an optimum fluidizing-gas velocity in the preceding dewatering zone.

The previously proposed processes using clouds of dust are also unsatisfactory because a uniform combustion of the fuel without overheating effects is difficult to procure. Besides, high combustion temperatures are required for a high thermal efficiency, particularly in high-temperature processes, if the combustion is effected in a combustion chamber disposed outside the furnace. Such high combustion temperatures involve difficulties regarding the materials of construction.

The principal object of this invention is to eliminate the disadvantages which have been discussed hereinbefore.

In general, these objects are obtained by a process for producing anhydrous alumina from aluminum hydroxide with the aid of a fluidized bed, in which the solids are discharged together with the gases from the upper section of the shaft; part of the heat is supplied by feeding gases at a temperature of at least 300° C. into the fluidized bed over the grate, and the solids discharged from the upper section of the shaft are separated from the gas in a recirculating cyclone and are at least partly recirculated to the fluidized bed. The process is characterized in that aluminum hydroxide is subjected to dewatering and to partial dehydration in a multiple-stage suspension-type heat exchanger operated with the exhaust gases from the fluidized bed furnace, and is fed through a separator to the fluidized-bed furnace, which is also fed with at least part of the solids which have been separated in a recirculating cyclone from the calcining zone. The latter is maintained at a temperature of from 600 to 1,200° C. Part of the solids are branched from the solids cycle, e.g., at the recirculating cyclone thereof or at the fluidized-bed furnace, and are fed into a fluidizing cooler, which is provided in its bed with cooling registers and is supplied with air as a fluidizing gas and as a coolant for the cooling registers. The heated cooling air leaving the cooling registers is supplied as fluidizing gas to the fluidized bed furnace and the heated fluidizing gas leaving the fluidized bed cooler is supplied to the fluidized-bed furnace as secondary air at a zone above the grate, the height of the secondary air inlet over the grate being about 0.3 to 1.5 times the height of water gauge in mm. corresponding to the pressure drop (i.e., the pressure drop in terms of mm. $H_2O$ in a water-column gauge) to which the fluidized bed in the furnace shaft is adjusted. The flows of cooling air supplied from the fluidized-bed cooler to the fluidized-bed furnace as fluidizing gas and as secondary air are in a volume ratio of 1:2 to 4:1, and heating is effected by a supply of residue-free fuel to the zone between the grate and the secondary-air inlet.

The pressure drop in the furnace shaft is a function of the solids loading or density and defines at the same time the residence time. It is in the range of 400 to 2,500 mm. of water gauge.

Figure 2:
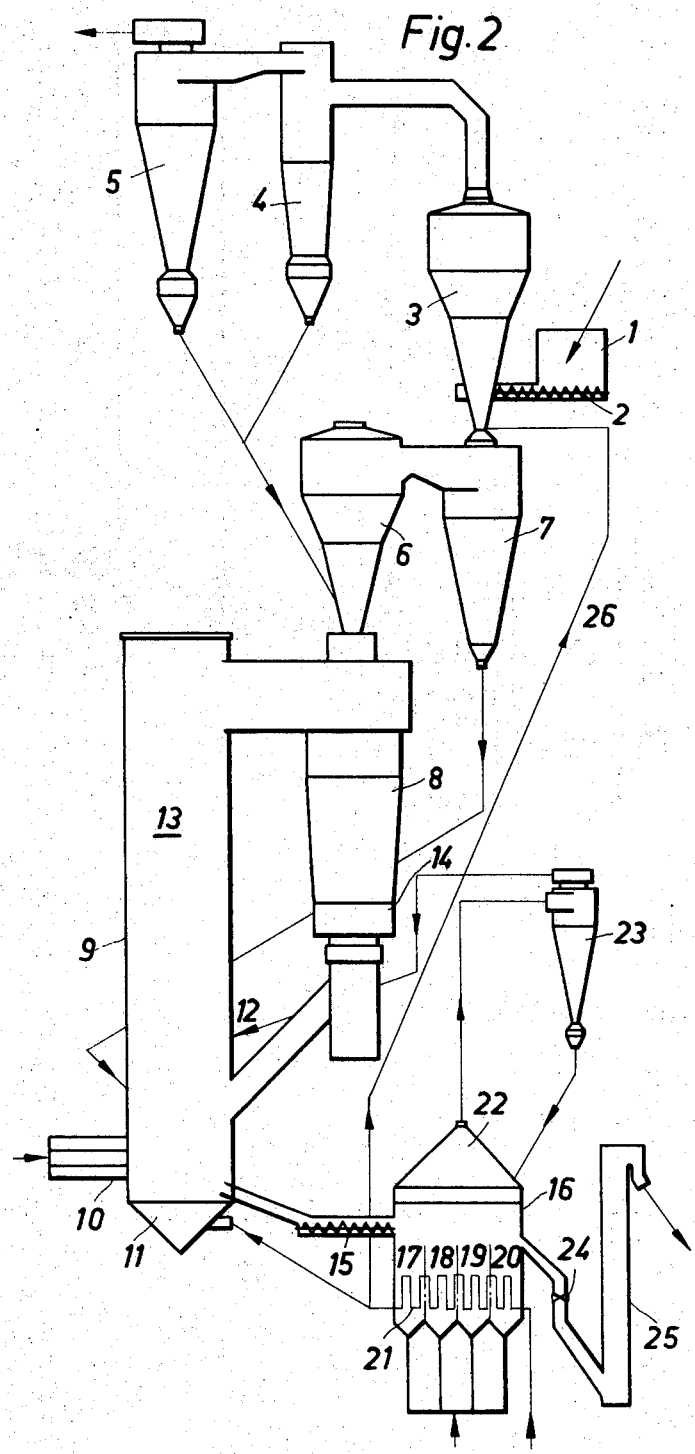

The means by which the objects of the invention are obtained are described more fully with reference to the accompanying drawing in which:

FIG. 1 is a diagrammatic view of the apparatus; and
FIG. 2 is a similar view of a modification of the apparatus.

As shown in FIG. 1, the raw material, aluminum hydroxide, passes from bin 1 by way of a screw conveyor 2 into a first venturi dryer 3 forming a part of a multistage suspension-type drying stage including the following cyclone separators 4 and 5. The material then flows through connecting pipes into the venturi-type fluidizing dryer 6 and then into a cyclone separator 7 from which the materials flow into the fluidized-bed furnace shaft 9. Material leaving the upper portion of the furnace enters the recirculating cyclone 8. Fuel for the furnace is supplied through pipe 10 which is immediately above the grate 11. Secondary air enters the furnace shaft through air inlet opening 12 above the grate 11. The shaft has an upper zone 13 in which the solids concentration above the fluidized bed is reduced.

From cyclone 8, a portion of the separated solids is returned through a suitable device 14 to the shaft 9. Another portion of the solids is fed through conveyor 15 into a fluidized cooler 16 which is divided into a number of chambers 17, 18, 19 and 20, respectively. The cooler 16 contains a tube-bank system or register 21 which functions as a heat exchanger. The cooler is covered by a hood 22 from which heated air passes into the dust cyclone 23. From this cyclone, the secondary air flows into air inlet 12. From the air cooler 16, the solids pass through a rotary valve 24 into a bucket conveyor 25 from which the solids are removed by any suitable conveyor means.

The modification of FIG. 2 is similar to FIG. 1 with the additional feature that a portion of the indirectly heated air is branched off through pipe 26 and fed into the dryer 3.

The desired state of distribution of the solids is adjusted in the fluidized-bed furnace by the division of the air which is required for combustion of the fuel. The fluidizing air which is supplied through the grate 11 produces a highly agitated fluidized bed, which has a solids concentration near the lower limit of the value which is usual in an orthodox fluidized-bed, i.e., at about 600 to 1,000 kg./cu.m. The supply of secondary air on a suitable level to the furnace shaft 9, which is cylindrical or may be enlarged in its upper part, results in the formation of a cloud of dust in the section of the shaft above the level of the bed. In this cloud of dust, the solids concentration continuously decreases from the above-mentioned values to about 1 kg./cu.m. at the gas outlet. In dependence upon the circulation of material in the interior of the kiln, the average concentration of solids is about 10 to 100 kg./cu.m.

The solids which are carried by the gas stream out of the vertical furnace are at a temperature of 600 to 1,200° C. and are separated in the recirculating cyclone 8. The exhaust gases flow from the recirculating cyclone at the same temperature into the multiple stage suspension-type exchange system, where they subject the moist aluminum hydroxide to dewatering and to partial dehydration, in the course of which their heat content is substantially completely utilized. By dewatering and partial dehydration, the mechanically adhering water is virtually completely removed and the chemically combined water is partly removed. The suspension-type exchangers consist preferably of venturi-type fluidizing dryers; in this case, each venturi-type fluidizing dryer and an associated cyclone form a drying stage. Venturi-type fluidizing dryers are desirable because they can easily be operated and have a high thermal efficiency.

The feed is charged in the moist state in which it is obtained after filtration the first venturi-type fluidizing dryer 3 in the direction of the gas flow from the fluidized-bed furnace. An upwardly discharged suspension is formed, which is received by a cyclone. The separated solids are charged into the following venturi-type dryers in the direction of the gas flow and are supplied by separator 7 to the lower section of the fluidized-bed furnace.

With the aid of a two-stage venturi system, the temperature of the exhaust gases may be reduced to the dew point and the water content of the aluminum hydroxide may be reduced to an ignition loss is from 1 to 3 percent.

Anhydrous alumina (ignition loss less than 0.2 percent) is obtained in the recirculating cyclone 8 and is entirely or partly recirculated into the fluidized bed of the fluidized-bed furnace. The product obtained by the process is withdrawn from the recirculating cyclone or at another suitable point, e.g., the fluidized-bed furnace, in a controlled manner and supplied to fluidizing cooler 16.

The combustion air required in the fluidized-bed furnace is used for cooling the solids in the fluidizing cooler. The cold air is divided into two streams for a direct and indirect heat exchange, respectively. In the direct heat exchange, air is used as a fluidizing gas. In the indirect heat exchange, air is used as a coolant flowing through cooling registers disposed in the fluidized bed.

The fluidizing cooler 16 is preferably divided into a plurality of chambers 17, 18, 19 and 20, which are arranged in succession along the path of the solids, so that the air in the cooling registers flows in countercurrent to the hot solids and the fluidizing air used in the fluidized-bed cooler flows in a transverse stream.

The partial streams which have thus been heated are separately supplied to the fluidized-bed furnace. The partial stream which has passed through the cooling registers of the fluidized-bed cooler and which has been indirectly heated is used as a fluidizing gas in the fluidized-bed furnace. The fluidizing gas used in the fluidized-bed cooler is used as secondary air in the fluidized-bed furnace. This use of the gas streams has the advantage that the fluidizing gas intended for the fluidized-bed furnace is free from dust so that a clogging of the grate will be reliably avoided. The dust which remains in the gases used as secondary air after the removal of dust in a cyclone does not involve any difficulty because the means for injecting the secondary air are insensitive to the presence of entrained particles.

The cooling air streams used for the indirect and direct heat exchange, respectively, have usually a volume ratio of 1:2 to 4:1. This ratio can be selected in accordance with the operating conditions of the calcining unit.

It is desirable to supply part of the heated cooling air from the fluidizing cooler into the last suspension-type exchanger stage in the direction of gas flow so as to avoid a cooling of the exhaust gases to a temperature below the dew point. This measure also avoids an excessive gas loading of the fluidized-bed furnace. In the above-mentioned, desirable development of the process, the range of the ratio of the cooling air streams may be slightly changed.

Residue-free fuels are used to supply the energy which is required. Liquid and gaseous hydrocarbons are particularly advantageous. The ratio of combustion air which is supplied as fluidizing gas and secondary air to the fluidized-bed furnace to fuel is selected so that the percentage of air in excess of the stoichiometric requirement is 0 to 40, preferably 5 to 10. Whereas there is a deficiency of oxygen at the point where the fuel is supplied, in the lower portion of the fluidized-bed furnace below the secondary air inlet, the high concentration of solids at a uniform temperature in the fluidized bed will ensure a quantitative reaction of the fuel before the outlet of the furnace.

The process according to this invention enables a production of oxides of very high purity and uniform quality at low heat consumption rates, which are under 800 kcal./kg. of $Al_2O_3$, and without difficulties in the operation of the furnace, such as might be caused by a clogging of the grate or a blast of solids. Without need for a change of the plant, aluminas of various modifications can be produced by a change of the excess of air, the calcining temperature and the average residence time of the solids in the fluidized-bed furnace.

Example 1

(with reference to FIG. 1)

Moist aluminum hydroxide containing 12 percent mechanically adhering water was fed from a feed bin 1 by means of a screw conveyor 2 at a rate of 2.97 metric tons per hour into the second venturi-type dryer 3 in the direction of gas flow, and is entrained by the exhaust gas stream which comes from the first drying stage in the direction of gas flow and is at a temperature of 550—630° C. Before the stream of gas and entrained solids was separated in the two following cyclones 4, 5, all the mechanically adhering water and part of the chemically combined water had evaporated. The exhaust gas discharged from the cyclone 5 at a temperature of 100° C. was fed to an electrostatic precipitator, not shown, for the collection of dust.

The solids discharged from the cyclones 4, 5 entered the venturi-type fluidizing dryer 6 and were entrained there by the gas stream which was discharged from the cyclone 8 for recirculating the fluidized bed solids. In the cyclone 6, water was removed from the solids to an ignition loss of 2—3 percent. In the cyclone 7, the stream of gas and entrained solids was again subjected to separation. The dewatered solids enter the fluidized-bed furnace 9 and the exhaust gases were fed into the above-mentioned fluidizing dryer 3.

The fluidized-bed furnace 9 had an inside diameter of 0.8 meters and an inside height of 9 meters. The quantity of heat required for calcining was supplied by a direct combustion of bunker C oil at a rate of 140 kg./h. The oil was injected through pipe 10 into the bed slightly above the grate 11. The air at a rate of 1,900 standard cubic meters per hour required for the fluidization of the solids was supplied in two equal parts. One part is supplied through the grate 11 as fluidizing gas. The other part is supplied as secondary air through air inlet 12 at a height of 0.8 meter over the grate. The fluidized bed which was thus formed in the lower zone of the furnace between the grate 11 and secondary air inlet 12 had a solids concentration of about 800 kg./cu.m. This promoted the combustion of the oil and highly increased the average residence time in the fluidized-bed furnace.

As a result of an internal recirculation of solids, the solids concentration in the upper zone 13 of the furnace was continuously decreased to about 4 kg./cu.m. With this concentration, the suspension enters the recirculating cyclone 8, where gas and material are separated.

The separated alumina was partly returned by a fluidized-bed seal device 14 into the fluidized-bed furnace 9 and was partly charged by a metering feeder 15 into a fluidizing cooler 16. The rate at which the solids were fed into the fluidizing cooler was controlled to maintain a pressure drop corresponding to 1,200 mm. of water gauge in the fluidized-bed furnace. As a result, the ratio of the level of the second air inlet and the pressure drop is 0.67.

Alumina was fed at a rate of 1.70 metric ton per hour into the fluidizing cooler having four chambers 17, 18, 19, 20, and was cooled below 250° C. simultaneously by direct and indirect heat exchange with air. For this purpose, air at a rate of 950 standard cubic meters per hour was passed in a countercurrent to the solids through a tube-bank system or registers 21, which are suspended in the chambers 17, 18, 19 and 20. This air was heated to 500—550° C. by said heat exchange. Air at a rate of 950 standard cubic meters per hour was used as fluidizing air in the cooler and when discharging from the various chambers through hood 22 and mixed also had a temperature of about 500° C. Dust-free air passed through the tube-bank system 21 of the cooler was supplied through the grate 11 to the fluidized-bed furnace 9. The heated air which had been used for fluidization in the fluidizing cooler 16 was passed through the cyclone 23 for dust collection and was injected into the fluidized-bed furnace 9 as secondary air through air inlet 12.

The solids discharged from the fluidized-bed cooler 16 were fed by a rotary valve 24 and a bucket conveyor 25 to a pneumatic transporter leading the electrolyzing unit.

The procedure which has been described hereinbefore affords the following advantages:

1. Bunker C oil is burned in the furnace most uniformly and without formation of soot.

2. The temperature at which calcination is effected in the fluidized-bed furnace and the temperature of circulating fluidized-bed solids is constant and uniform throughout the cycle and amounts to 1,100° ± 15° C.

3. The entire system for the circulation of the fluidized-bed solids may be adjusted to the solids content which is deemed desirable. This will determine the desired residence time. In the present example, the solids content was adjusted to 1.6 metric tons, corresponding to a residence time of 56.5 minutes.

4. A most uniform product is obtained, which is suitable for electrolysis.

5. The heat consumption is 790 kcal./kg. $Al_2O_3$.

6. The specific throughput per square meter of the cross section of the shaft is 51 metric tons of $Al_2O_3$ product per day.

Example 2

(with reference to FIG. 2)

The plant which was employed was virtually the same as that for Example 1 but had an additional conduit 26. Part of the cooling air which was discharged by the tube banks 21 was fed by this conduit 26 to a point between the first and second drying stages, i.e., between units 3 and 7.

Moist aluminum hydroxide containing 12 percent mechanically adhering water was fed at a rate of 3.48 metric tons per hour by the screw conveyor 2 from the feed bin 1 into the second venturi-type dryer 3 in the direction of gas flow and was entrained by the exhaust gas stream coming at a temperature of 300—350° C. from the venturi-type drying stage 6, 7 in the direction of gas flow and by the cooling air at a temperature of 500° C. and at a rate of 400 standard cubic meters per hour which was supplied by the conduit 26 to a point between the two venturi-type stages. Before the solids were removed from the stream of gas and entrained solids in the cyclone 4 and the fine cleaning cyclone 5, all mechanically adhering water and a small part of the chemically combined water had been driven off. At a temperature of 82° C., which is slightly over the dew point, the exhaust gases entered a venturi-type scrubber for a final purification of the gas. The solids which had been separated in the cyclones 4 and 5 entered the venturi-type fluidizing dryer 6, where they were entrained by the stream of gas which came from the cyclone 8 for recirculating the fluidized-bed solids. In the dryer 6, water was removed from the solids to an ignition loss of 5—7 percent. In the cyclone 7, the stream of gas and entrained solids were again separated. The dewatered material dropped through a downpipe into the fluidized-bed furnace 9 and the exhaust gas entered the fluidizing dryer 3.

The fluidized-bed furnace had an inside diameter of 0.8 meter and an inside height of 9 meters. Bunker C oil at a rate of 150 kg./h. was charged at 10 in a height of about 0.2 meter over the grate into the fluidized-bed, which was dense at this point, having a solids concentration of 600 kg./cu.m. The air at a rate of 1,250 standard cubic meters per hour which was required for providing this solids concentration in the lower part of the furnace below the secondary air inlet 12 was supplied through the grate, and the secondary air at a rate of 430 standard cubic meters per hour is supplied in a height of 1.2 meters over the grate. Both air streams had been preheated to 500° C. by direct and indirect heat exchange in the fluidizing cooler. The ratio of roasting air to secondary air was about 3:1.

The internal recirculation of solids caused a continuous decrease of the solids concentration in the upper zone 13 of the furnace to about 3 kg./cu.m. At this concentration, the suspension entered the recirculating cyclone 8, where the solids were separated.

The separated alumina was completely recirculated into the fluidized-bed furnace by a seal 14 and was partly charged by a metering feeder 15 into fluidizing cooler 16. The discharge of the feeder 15 was controlled to maintain in the furnace a pressure drop corresponding to 1,700 mm. of water gauge. Hence the ratio of the level of the second air inlet to the pressure drop is 0.71.

The fluidizing cooler was divided into four chambers in the direction of solids flow. A fluidized bed having an exactly defined surface was formed in the fluidizing cooler, in which the solids discharged from the furnace at a rate of 2.0 metric tons per hour were cooled to 200° C. simultaneously by indirect and direct heat exchange. For this purpose, air at a rate of 1,650 standard cubic meters per hour was conducted in a countercurrent to the solids through tube bank system 21, which was suspended in the chambers. In this system, the air was heated to 500° C. 1,250 standard cubic meters of this fluidized bed dust-free air per hour were supplied as fluidizing air through the grate. 400 standard cubic meters per hour were directly supplied to the second venturi-type stage in the direction of gas flow. 430 standard cubic meters of air per hour were used as fluidizing air in the cooler. After leaving the chamber, this air was mixed in hood 22 to obtain a temperature of about 500° C. This air was cleaned in the cyclone 23 and was supplied to the fluidized-bed furnace 9 on the level 12 as secondary air. The ratio between the air streams which are indirectly and directly heated in the cooler was 3.8:1. The solids discharged from the fluidizing cooler 16 were conveyed to the silo by rotary valve 24 and a bucket conveyor 25.

Using a complete, residue-free combustion with an excess of 5 percent of air, the procedure which has been described hereinbefore gives the following results:

1. The calcining temperatures throughout the calcining cycle can be highly uniformly adjusted to 850 ± 10° C.
2. The solids content of the circulating fluidized bed solids is about 2.25 metric tons, so that an average solids residence time of 67 minutes can be adjusted.
3. The heat consumption is about 725 kcal./kg. alumina.
4. A high specific throughput of 60 metric tons per day per square meter of the shaft cross section is obtained.
5. A gamma-oxide of alumina of high purity and uniformity is produced, which is particularly desirable as a starting product for a chemical process.

Having now described the means by which the objects of this invention are obtained,

We claim:

1. A process for producing anhydrous alumina from moist aluminum hydroxide, comprising the steps of:
   a. heating dewatered and partially dehydrated aluminum hydroxide particles to a temperature of 600° to 1,200° C. and converting same to anhydrous alumina in a fluidized bed by introducing a fluidizing gas at a temperature of at least 300° C. into said fluidized bed above the bottom thereof and a combustion-sustaining fluidizing gas into said bed through the bottom thereof;
   b. removing from above said fluidized bed a mixture of solids and hot exhaust gas and separating the hot exhaust gas from said solids;
   c. recirculating at least part of the solids separated in step (b) to the bed of step (a);
   d. dewatering and partially dehydrating moist aluminum hydroxide at least in part by subjecting the same to direct contact with at least part of the hot exhaust gas separated in step (b) while suspending the moist aluminum hydroxide in said hot exhaust gas, and recovering dewatered and partially dehydrated aluminum hydroxide therefrom;
   e. feeding the dewatered and partially dehydrated aluminum hydroxide from step (d) to the fluidized bed in step (a);
   f. recovering anhydrous alumina from said fluidized bed at a temperature of 600 to 1,200° C.;
   g. cooling the anhydrous alumina recovered in step (f) by fluidizing same with a first portion of cooling air and abstracting heat from the anhydrous alumina with a second portion of cooling air in indirect heat exchange with the hot anhydrous alumina, thereby heating said first and said second portions of said cooling air;
   h. feeding said first portion of the air heated in step (g) to said fluidized bed in step (a) at a location above said bottom as secondary air, and feeding said second portion of said air heated in step (g) to said bed through said bottom as a fluidizing gas, said location having a height above said bottom between 0.3 and 1.5 times the pressure drop across the fluidized bed in terms of millimeters of a water-column measure of said pressure drop, the volumetric ratio of said second portion to said first portion ranging between 1:2 to 4:1; and
   i. introducing a combustible fuel into said fluidized bed between said grate and said location to further heat said bed.

2. The process defined in claim 1 wherein the secondary air of step (h) is introduced into said bed at a location spaced above the bottom of said bed by a distance between 0.5 and 0.8 times said pressure drop.

3. The process defined in claim 1 wherein the moist aluminum hydroxide is dewatered and partially dehydrated in step (d) by passing the moist aluminum hydroxide through a two-stage venturi-type fluid-bed preheater.

4. The process defined in claim 1 wherein the anhydrous alumina is cooled in step (g) by passing the same in succession through a plurality of cooling compartments while fluidizing the anhydrous alumina in said compartments with said first portion of cooling air, said second portion of cooling air being passed through said compartments countercurrent to said anhydrous alumina and in indirect heat exchange therewith.

5. The process defined in claim 1, further comprising the step of passing part of the cooling air heated in step (g) into heat exchanging relationship with the moist aluminum hydroxide in step (d).